Sept. 8, 1931.  L. REICHOLD  1,822,314
ELECTRIC COOKING APPARATUS
Filed April 3, 1929
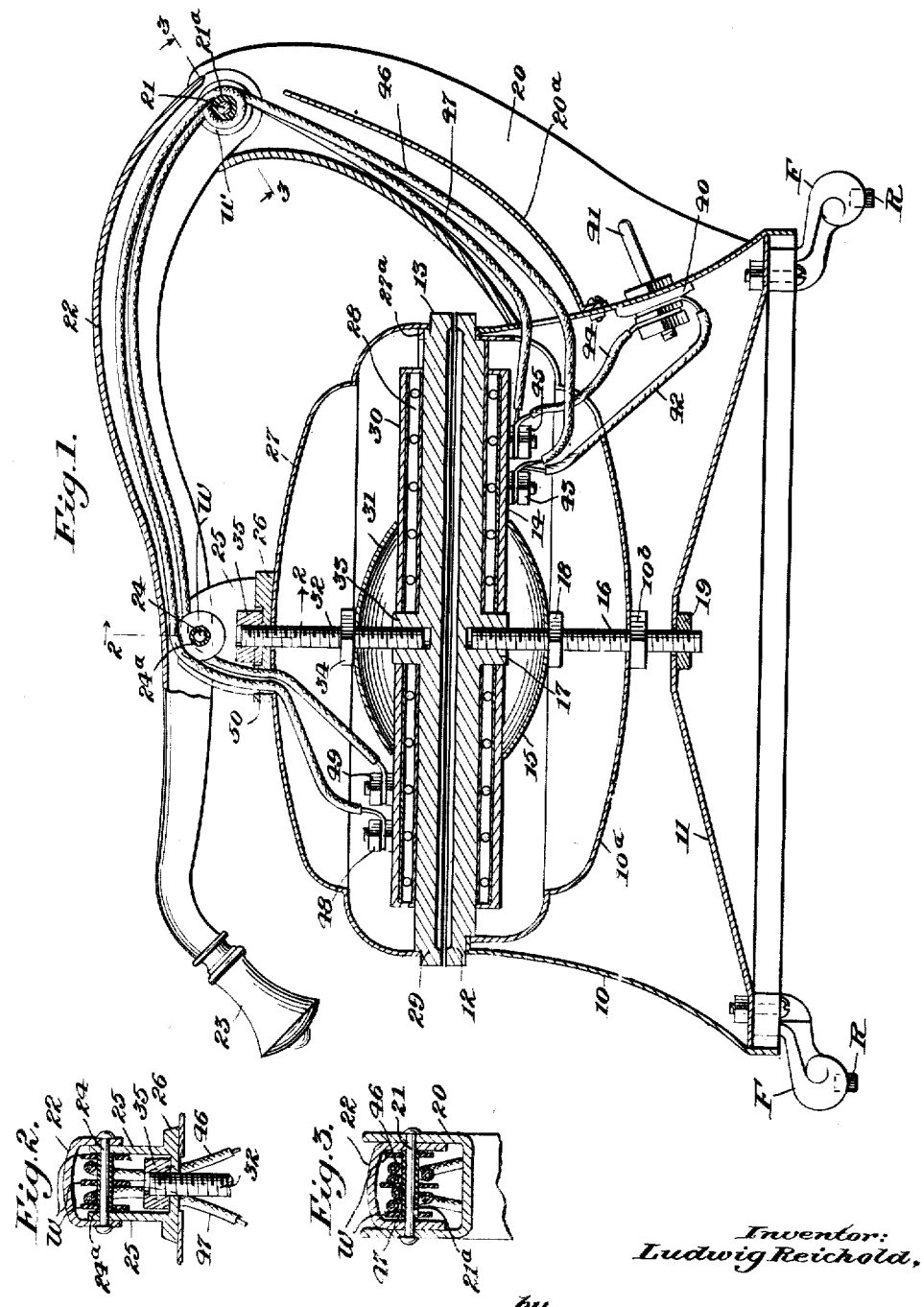
Inventor:
Ludwig Reichold,
by
Att'ys.

Patented Sept. 8, 1931

1,822,314

UNITED STATES PATENT OFFICE

LUDWIG REICHOLD, OF WINSTED, CONNECTICUT, ASSIGNOR TO THE FITZGERALD MANUFACTURING CO., OF TORRINGTON, CONNECTICUT, A CORPORATION OF CONNECTICUT

ELECTRIC COOKING APPARATUS

Application filed April 3, 1929. Serial No. 352,219.

This invention relates to improvements in electric cooking apparatus, and more particularly concerns an apparatus in which an upper heatable plate is to be moved into and out of the cooking position.

One of the features of the present invention is the provision of an electric cooking apparatus in which the upper heatable plate is pivotally mounted on a supporting arm which is moved therewith into and out of the cooking position, this arm being pivoted to the base of the apparatus.

Another feature of the invention is the provision of a hollow supporting arm through which the conductors may be led to the heating element associated with this upper plate.

A still further object of the invention is to provide an electric cooking apparatus in which the upper heatable plate is formed to be substantially symmetrical with respect to the pivotal connection to the supporting arm whereby it is presented in a proper normal position for cooking, but is able to adapt itself by reason of such pivotal connection to irregularities in the shape and thickness of the article being cooked.

An illustrative form of the invention is shown on the accompanying drawings, in which:

Figure 1 is a vertical sectional view through the apparatus.

Fig. 2 is a cross section on line 2—2 of Fig. 1.

Fig. 3 is a cross section on line 3—3 of Fig. 1.

The electric cooking apparatus according to the present invention comprises a base having the feet F with rubber pads R and including the lower jacket 10 with a dished bottom closing plate 11 and the lower heatable plate 12 having the lower heating element 13 in close juxtaposition thereto. This heating element 13 is illustrated as comprising sheets of mica with the heating conductors held therebetween. The lower clamping plate 14 is engaged by the lower cup 15. The lower clamping bolt 16 is threaded into a boss 17 on the lower heatable plate 12 and receives the nut 18 which clamps the cup 15 against the clamping plate 14 and thus the lower heating element is held fixedly against the lower heatable plate 12. A second nut 10$b$ engages and clamps the lower dome 10$a$. A third nut 19 on the bolt 16 engages the lower dished plate or base plate 11.

The lower jacket 10 has fixedly secured thereto a hollow bracket 20, shown as formed of sheet metal in a U-shaped section and supporting a pivot pin 21 at its outer, upper end and having a shield 20$a$ therein to define a conductor-receiving closed channel.

A hollow supporting arm 22 is likewise illustrated as being of a U-shaped section with the opening downward, and being carried at its rearward end by the pivot 21 and being provided at its forward end with a suitable handle 23. Substantially in line with the axis 16, when the upper heatable plate is in its cooking position, a pivot 24 is provided on the hollow supporting arm 22 to receive the ears 25 of a swivel attaching clip having a base 26 conforming to the upper surface of the upper dome 27 which at its periphery is formed with an inbent flange 27$a$ to rest against the upper heatable plate 29.

This upper heatable plate is provided with an upper heating element 28 likewise formed of two sheets of mica or the like having the heater wires located and held therebetween. The upper clamping plate 30 is engaged by the upper cup 31. The upper clamping bolt 32 is threaded into the boss 33 of the upper heatable plate 29, and receives a nut 34 which holds the upper cup 31 against the upper clamping plate 30 and thus maintains the upper heating element 28 fixedly in position against the upper heatable plate 29. A second nut or internally threaded cap 35 on the bolt 32 engages an upper surface of the base 26 of the swivel clip and thus clamps the swivel clip and the upper dome 27 fixedly against the upper heatable plate 29.

An insulating member 40 carried by the lower dome 10 supports the terminal prongs 41 by which current may be introduced into the apparatus. These prongs are protected within the hollow bracket 20. The insulated conductor wire 42 leads from one of these terminals to a terminal 43 of the lower heating element 13, and a further insulated conductor 44 is provided from the other terminal 45 of the lower heatable element 13 back to the other terminal prong 41. Insulated conductors 46, 47 lead from the respective terminals 43, 45 through the hollow bracket 20 and the hollow supporting arm 22 to the corresponding terminals 48, 49 for the upper heating element 28. These conductor wires are given a loose turn about the insulating sleeve 21a on pivot 21 to hold them against buckling or being pulled out of position within the hollow bracket 20 in the hollow supporting arm 22: and for the same reason are brought over the insulating sleeve 24a on pivot 24. They are led downward through an opening 50 in the base 26 of the swivel clip and a corresponding aperture in the upper dome 27. Washers W of insulating material are preferably provided on sleeves 21a and 24a to prevent short circuits or grounds of the conductors 46 and 47 if the insulation thereon becomes chafed.

In operation, the upper heatable plate 29 with its heating element 28, dome 27 and clip 25 are so constructed that the device is substantially evenly balanced about the vertical plane defined by the axis of the pivot 24. The upper heatable plate 29 therefore remains substantially horizontal throughout a wide range of movement of the supporting arm 22, until the clip ears 25 engage the inner surface of this supporting arm and preclude a further adaptation of the upper heatable plate and its associated parts to its horizontal position. In this way, as the handle 23 is raised and lowered, and by reason of the distance between and the position of pivots 21 and 24, the upper heatable plate 29 maintains itself in a horizontal position and moves substantially directly away from and toward the lower heatable plate 12. The illustrated form of the device is particularly adapted for toasting sandwiches, the made-up sandwich being placed upon the lower heatable plate 12 while the supporting arm has been drawn up and back a sufficient distance. The handle 23 is then moved to bring the arm and upper heatable plate 29 down until the upper heatable plate 29 comes into contact with the upper surface of the sandwich. The upper heatable plate can then conform itself in angular position to the shape and thickness of the sandwich, while exerting a slight pressure thereon. In this way, a substantially uniform toasting of the upper surface of the sandwich and even pressure upon its area is attained.

It is obvious that the invention is not limited to the form of device shown, but that it may be employed in many ways within the scope of the appended claims.

What I claim as new and desire to secure by Letters Patent is:

1. An electric cooking apparatus having a frame, a lower heatable plate fixed to said frame, a hollow arm, an upper heatable plate, a bracket on said frame extending rearwardly and upwardly above the said upper plate when the latter is in heating position adjacent said lower plate, a horizontal pivot connection between said bracket and arm, a pivot connection between said upper plate and said arm, said horizontal pivot connection being located above the said plate when the latter are in cooperation position for cooking, and conducting wires leading to said upper heating element and located within said hollow arm and passing around said horizontal pivot.

2. An electric cooking apparatus having a frame, upper and lower heating elements, a hollow supporting arm pivoted to said frame, a pivot support extending upwardly from said upper heating element, a pivot for connecting said support and arm, and conducting wires leading to said upper heating element and passing within said hollow arm and pivot support.

3. In an electric cooking apparatus having an upper heatable plate, an upper heating element, an upper clamping plate, and a bolt engaging said heatable plate and passing through said heating element and clamping plate, of a pivotally mounted supporting arm, a U-shaped clip having its ends pivotally connected to said arm, and means located in and engaging the base of the said clip and engaging said bolt to hold said clip and clamping plate to said heatable plate.

4. In an electric cooking apparatus, an upper heatable plate, an upper heating element, an upper clamping plate, a bolt engaging said heatable plate and holding said clamping plate and element against said heatable plate, a hollow supporting arm, a swivel clip pivoted to said arm and having a passage therethrough, means engaging said bolt to hold the said clip to said heatable plate, and wires connected to the heating element and passing within the hollow arm and through the passage in said clip so that they are not exposed.

In testimony whereof, I affix my signature.

LUDWIG REICHOLD.

DISCLAIMER 1,822,314.—*Ludwig Reichold*, Winsted, Conn. ELECTRIC COOKING APPARATUS. Patent dated September 8, 1931. Disclaimer filed August 30, 1933, by the assignee, *The Fitzgerald Manufacturing Company*.

Hereby disclaims the subject matter of claim 2.

[*Official Gazette September 26, 1933.*]